March 14, 1967 E. J. HARRINGTON 3,308,968
APPARATUS FOR DELIVERING RODS ONE AT A TIME FROM A BUNDLE
Filed March 22, 1965 3 Sheets-Sheet 3

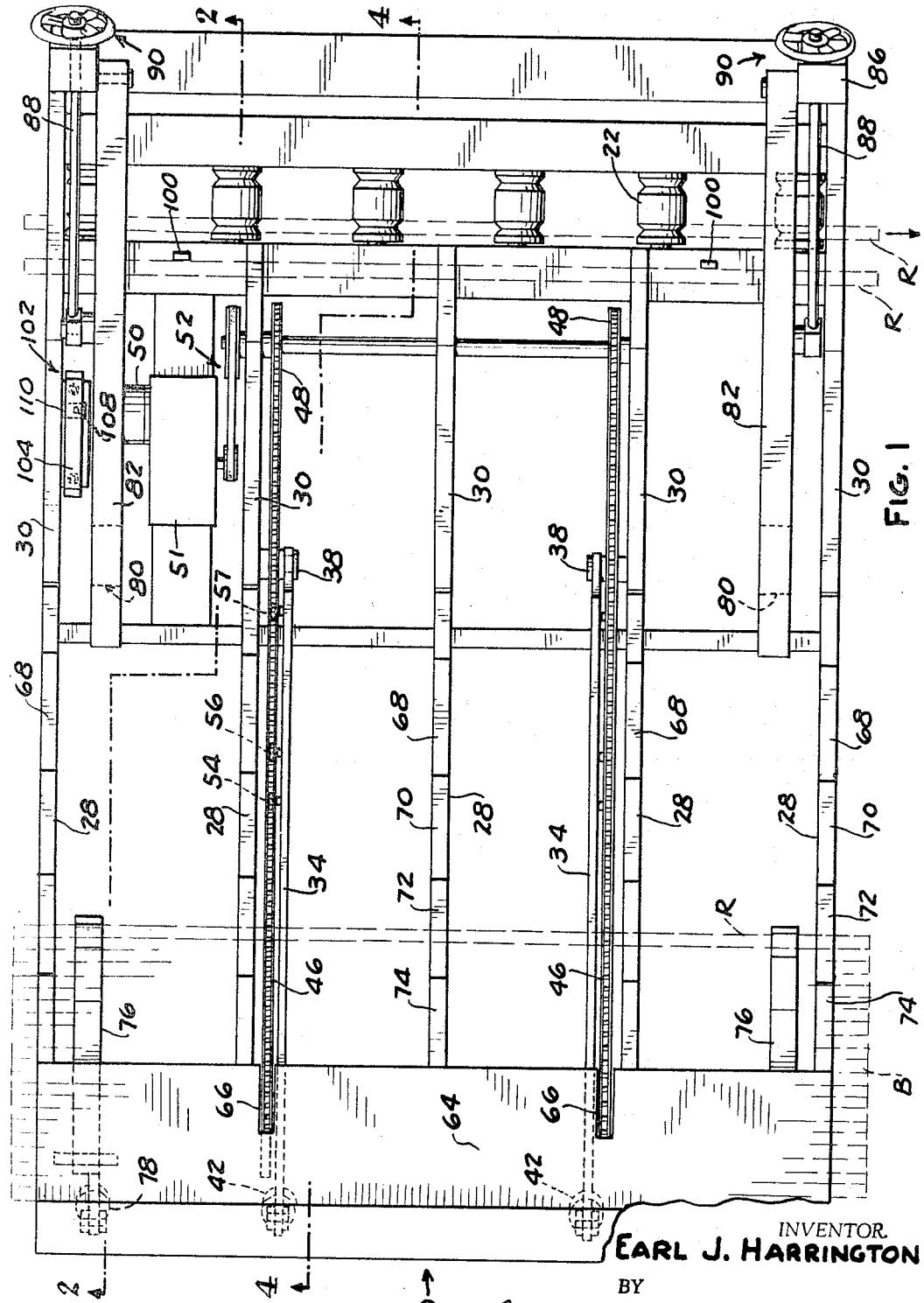

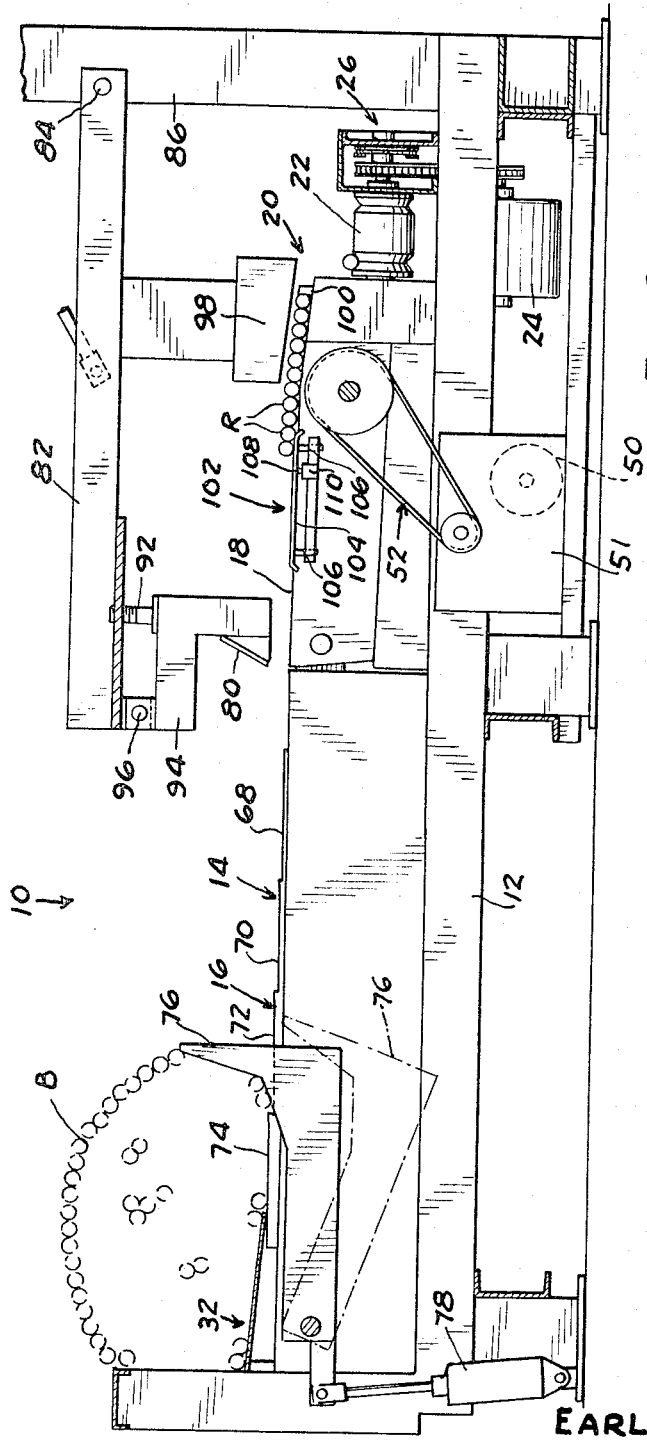

INVENTOR.
EARL J. HARRINGTON
BY
Barnes, Kisselle, Raisch & Choate
ATTORNEYS

United States Patent Office 3,308,968
Patented Mar. 14, 1967

3,308,968
APPARATUS FOR DELIVERING RODS ONE AT A TIME FROM A BUNDLE
Earl J. Harrington, St. Clair Shores, Mich., assignor to Spurgeon Co., Ferndale, Mich., a corporation of Michigan
Filed Mar. 22, 1965, Ser. No. 441,554
11 Claims. (Cl. 214—11)

This invention relates generally to apparatus for receiving bundles of elongate objects such as rods of bar stock, tubes, and the like, reducing the bundle to a single layer train of rods in side-by-side relation, and delivering them one at a time to other mechanism as required. The invention particularly involves the part of the apparatus by which the bundle is so reduced. Apparatus of this general type is frequently referred to in the trade as a "rod unscrambler," which terminology is used herein for the sake of convenience.

It is conventional in rod unscramblers to utilize gravity, sometimes assisted by powered mechanism to reduce or unscramble a bundle of rods. One problem in such unscramblers is to prevent avalanching of the rods toward the discharge point. Avalanching complicates the process of discharging the rods singly and also may cause damage to the unscrambler where the rods are of heavy bar stock. Since the rod bundles weigh up to ten tons or more, mechanism heretofore used for positive feeding of the rods has been relatively complex and expensive.

The object of this invention is to provide a rod unscrambler structure which is relatively simple and inexpensive, which utilizes positive means for delivering the rods to the discharge point, and which is improved to eliminate or minimize avalanche delivery of the rods to the discharge point.

The invention generally contemplates the use of a vertically movable frame beneath the table on which the rods are unscrambled, this frame carrying chains or the like which are elevated by the frame upwardly into dragging engagement with rods on the table for urging them toward the discharge point. The table top and chain mountings are arranged so that the chains first engage rods relatively near the discharge point and then engage rods progressively nearer the receiving point as the frame is elevated. The motor which elevates the frame exerts an upward force less than the initial weight of the bundle of rods on the table so that the frame cannot move the bundle of rods bodily.

One form of the invention is shown in the accompanying drawings.

FIG. 1 is a partly diagrammatic top plan view of apparatus according to the present invention.

FIG. 2 is a partly diagrammatic sectional view on line 2—2 of FIG. 1.

FIG. 3 is a diagrammatic elevational view illustrating steps in the table which supports the rods.

Figure 4:
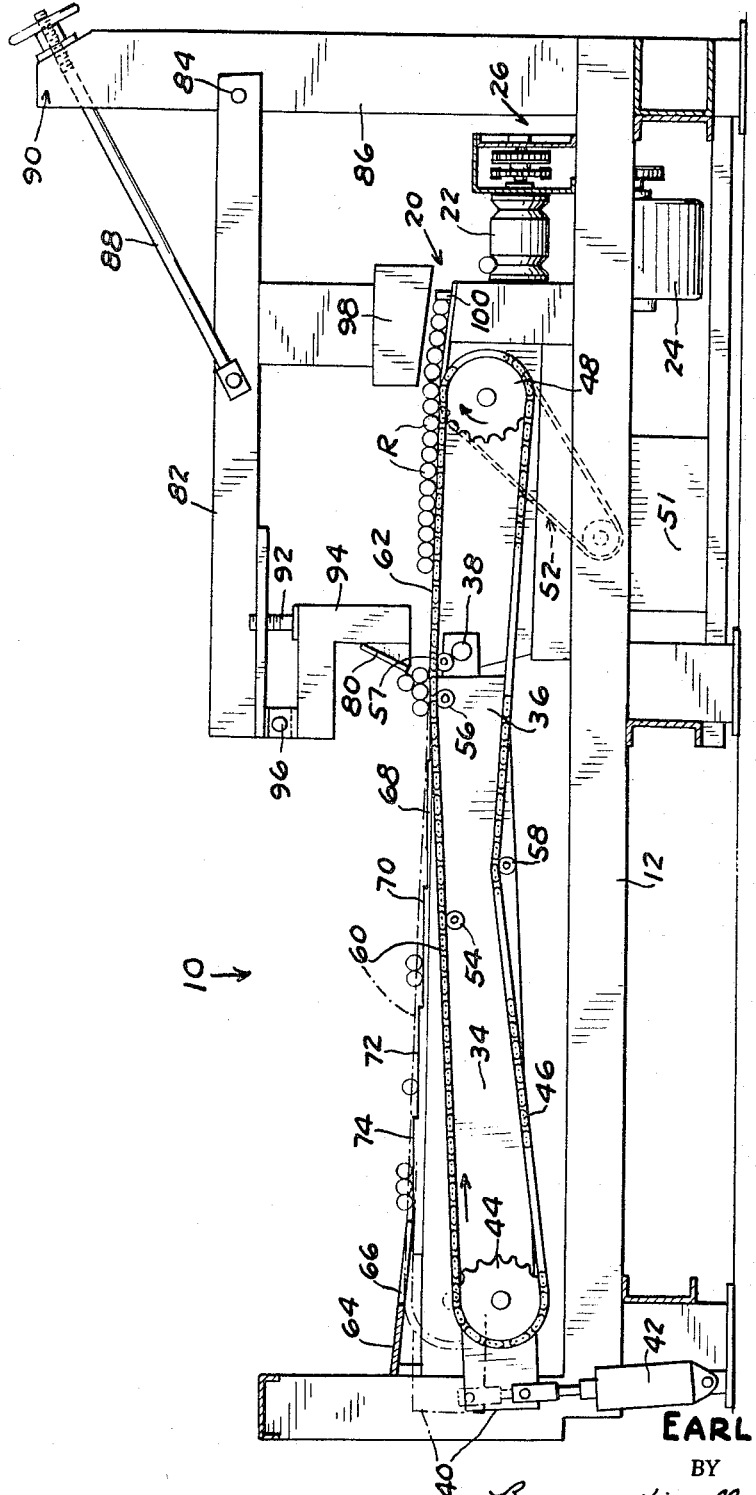
FIG. 4 is a partly diagrammatic sectional view on line 4—4 of FIG. 1.

Shown in the drawings is a rod unscrambler 10 according to the present invention having a bed 12 which supports a table 14 having an upstream stepped portion 16 and a downstream portion 18 which terminates at a discharge or delivery zone 20. Bed 12 also supports a series of grooved transfer rolls 22 which receive rods R one at a time from table 14 and carry the rods lengthwise away from the apparatus to other mechanism (not shown). At least one of rolls 22 is driven by a motor 24 through reduction gearing generally indicated at 26.

In the illustrated apparatus, table 14 has open framework construction comprising a number of spaced-apart members 28, 30 which extend from receiving zone 32 of the table to discharge zone 20. A frame 34 beneath table 14 has one end portion 36 pivotally mounted on bed 12 as at 38 so that its other end portion 40 can swing vertically toward and away from the bed. Fluid-pressure motors 42 control the elevation of frame end 40. Frame 34 adjacent its end 40 carries a pair of sprockets 44 over which a pair of chains 46 are trained. Chains 46 are driven by a pair of sprockets 48 mounted on bed 12, these sprockets in turn being driven by motor 50 through a reduction gear box 51 and a reduction pulley and belt drive generally indicated at 52. The chains are guided by upper rollers 54, 56 and a lower roller 58 on frame 34, and a roller 57 on bed 12.

Sprockets 44 and guide rollers 54 and 56 are positioned so that when frame 34 is in a lowered position as shown in solid lines in FIG. 4, the portions 60 of the upper run of each chain supported thereby extend downwardly away from table 14 in a direction away from delivery zone 20 toward receiving zone 32. The chains have upper run portions 62 supported by rollers 57 and sprockets 48. Run portions 62 project to the top of table portion 18 and generally parallel the downward slope of this table portion toward delivery zone 20.

Table 14 has a sloped plate 64 at its receiving zone 32, and this plate has slotting 66 through which upper run portions 60 of chains 46 project in the upward position of frame 34 (FIG. 4).

Table members 28 forming the upstream table portion 16 are provided with four steps 68, 70, 72, and 74. These steps are progressively both shorter and higher, proceeding in the direction away from discharge zone 20 toward receiving zone 32. With this arrangement, progressively increasing slopes are provided between the edges of steps 68–70, 70–72, and 72–74. The purpose of this arrangement is described below.

The capacity of fluid-pressure motors 42 is made intentionally smaller than the weight of a bundle B of rods with which the apparatus is adapted to be used so that motors 42 cannot lift a bundle B bodily by means of chains 46 and cause the rods of the bundle to avalanche toward discharge zone 20. So limiting the capacity of motors 42 may be done by limiting their size, limiting the amount of fluid pressure introduced thereto by suitable controls, or both.

A pair of arms 76 is pivotally mounted on bed 12 for swinging between an upward position shown in solid lines in FIG. 2 wherein they receive and position a rod bundle B at receiving zone 32 and a lower dotted-line position below table 14 to free the rods for rolling toward discharge zone 20. Arms 76 are controlled by suitable fluid-pressure motors 78.

A pair of plows 80 is supported above downstream portion 18 of table 14 by arms 82 pivoted at 84 on stanchions 86 mounted on bed 12. The height of each plow 80 is controlled by vertically swinging arm 82 by means of a tie 88 lengthened and shortened by a hand wheel and screw arrangement 90. The attitude of each plow 80 relative to the table top is adjusted by a screw 92 which swings plow support 94 about a pivotal connection 96 with arm 82. Arm 82 also carries a pair of guides 98 disposed over the table top immediately adjacent discharge zone 20.

An escapement is provided at the discharge zone for passing rods R one at a time from table 14 onto transfer rollers 22. This escapement is represented diagrammatically as a pair of stops 100 which are reciprocated vertically by suitable means (not shown).

A sensing device 102 is disposed at a downstream portion of table 14 to sense the absence of rods R. In the form illustrated, this sensing device comprises a plate 104 biased upwardly by springs 106 which are weak enough to be compressed under the weight of a rod R. The plate engages the plunger 108 of a switch 110. Suitable controls (not shown) are operably interposed between switch 110 and valving for fluid-pressure motors 42. As long as plate 104 is depressed by the weight of a rod thereon, these controls remain inactive. When plate 104 is empty of rods, springs 106 push it upwardly, allowing switch plunger 108 to move for throwing the switch and actuating the controls to increase the pressure in motors 42 for a purpose to be described.

In use, it may be assumed that plows 80 have been adjusted vertically above table portion 18 to provide just enough clearance so that single rods R of a known diameter may roll freely beneath them. The attitude of plows 80 has been adjusted by means of screws 92. Guides 98 are also positioned to clear only a single layer of rods R. Arms 76 have been elevated to the solid-line position of FIG. 3 by motors 78. Frame 34 and chains 46 thereon have been lowered to the solid-line position of FIG. 4.

A bundle B of rods is lowered onto receiving zone 32 of table 14 and is positioned and initially contained by arms 76. Motors 78 are actuated to lower arms 76 to free rods R in the bundle to roll down table 14 toward discharge zone 20. At this time, some of the rods may roll all the way to escapement 100. If any of the rods are still in stacked relation when they reach plows 80, the upper rods are prevented from passing beneath the plows so that only a single layer of rods in side-by-side relation can pass onto downstream table portion 18. Motor 50 is started to set chains 46 into motion. Fluid-pressure motors 42 are actuated to elevate frame 34.

At first, only relatively small pressure is admitted to motors 40 to bring upper run portions 60 of the chains into engagement with the rods adjacent the juncture of the upstream table portion 16 and downstream table portion 18, that is, in the vicinity of guide roller 56. It is to be noted that at this time, runs 60 of the chains are entirely out of contact with the rods near the upstream end of the table. As the chains move, they drag against the rods in the vicinity of roller 56 and urge them onto sloped downstream table portion 18 where they roll toward discharge zone 20. Run portions 62 of the chains drag against the rods on table portion 18 and provide a positive assist to gravitational feed of the rods toward the delivery zone.

As the rods are moved off of upstream table portion 16, the weight on frame 34 diminishes and motors 42 elevate the frame so that run portions 60 of the chains engage rods progressively further in an upstream direction. This process continues until run portions 60 begin to engage rods in the stepped portion of the table.

Because of the progressively shorter and higher configuration of the steps, run portions 60 of the chains still engage only those rods at the furthest downstream location, even though runs 60 reach horizontal or somewhat higher attitude. The rod feeding and elevation of frame 34 and the chains continues until chain runs 60 enter the slotting 66 in sloped plate 64. Thus, the rods at progressively further upstream locations are positively urged by the chains in a downstream direction until all of the rods have been delivered.

If at any time during this process, progress of the rods in a downstream direction is impeded or obstructed, pressure plate 104 will eventually be emptied as rods are released onto transfer rollers 22 by escapement 100. Thereupon, switch 110 is actuated in the manner described to operate valving for admitting greater pressure into motors 42 for further elevating frame 34. This provides increased urging by the drag of the chains on the rods to advance them toward discharge zone 20.

When the bundle has been partially or entirely reduced, pressure is relieved from motors 42 to lower frame 34, and arms 76 are raised to receive another bundle of rods. The entire process is then repeated. When rods of different diameters are unscrambled from successive bundles, the elevations of plows 80 and guides 98 are adjusted by hand wheel and screw devices 90 and the attitudes of plows 80 are adjusted by screws 92 for controlling the movement of rods of the new diameter.

By virtue of the sloping of chain runs 60 and the progressive change in the sizes of steps 68–74, there is a relative closing movement between the chain runs and effective table top which is progressive in a direction away from the discharge zone toward receiving zone 32 of the table. Limiting the upward force exerted by motors 42 prevents the chains from lifting a bundle bodily and thereby eliminates the possibility that the bundle will be avalanched toward the discharge zone under the action of frame 34 and chains 46.

I claim:

1. Apparatus for delivering rods and the like from a bundle one at a time to a delivery point comprising, means providing a table having a receiving zone adapted to receive and support a bundle of rods and the like, said table having a delivery zone and having portions which extend away from said receiving zone toward said delivery zone, said portions having surface portions disposed so that progressively diminishing downward slopes are provided between adjacent of said surface portions in the direction away from said receiving zone toward said delivery zone, drag means mounted for movement generally in a direction away from said receiving zone toward said delivery zone, drive means operable so to move said drag means, means mounting said drag means and table for relative movement from open relation to closed relation, said drag means in said open relation being operatively clear of rods and the like on said table, said drag means, responsive to said relative movement, being operative to engage and urge toward said delivery zone rods and the like on said table progressively further from said delivery zone, and motor means operative to effect said relative movement.

2. The apparatus defined in claim 1 wherein said portions of said table are stepped, corners of the steps comprising said adjacent surface portions.

3. The apparatus defined in claim 1 wherein said drag means comprises endless flexible means having a run which in one position of said drag means is disposed at an angle to said table portions, said angle converging in a direction away from said receiving zone toward said delivery zone.

4. The apparatus defined in claim 1 wherein said table comprises an open framework and said table portions comprise laterally spaced members, said drag means being mounted beneath said table and being movable upwardly into spacing beneath said members in said relative movement.

5. The apparatus defined in claim 1 wherein a plow is mounted above said table portions by a distance greater than the diameter of a single rod but less than twice said diameter whereby to pass only rods in a single layer to table portions downstream thereof, said downstream portions being sloped, said drive means being operable to move said drag means generally parallel to said slope downstream of said plow.

6. Apparatus for delivering rods and the like from a bundle one at a time to a delivery point comprising, means providing a table having a receiving zone adapted to receive and support a bundle of rods and the like, said table having a delivery zone lower than said receiving zone and having portions which extend between said receiving zone and delivery zone, drag means beneath said table mounted for movement generally in a direction away from said receiving zone toward said delivery zone, drive means operable so to move said drag means, means mounting said drag means for upward closing movement relative to said table progressively in a direction away from said delivery zone toward said receiving zone, said table having open portions through which said drag means is movable upwardly into contact with rods supported thereby, motor means operable to exert upward force of a predetermined magnitude on said mounting means, said force being smaller than the weight of a bundle of rods and the like with which said apparatus is adapted to be used, whereby said motor means is operable to gradually elevate said drag means to engage and urge toward said delivery zone rods and the like on said table progressively further from said delivery zone.

7. The apparatus defined in claim 6 wherein said drag means comprises endless flexible means and said mounting means comprises a generally vertically movable frame beneath said table, said flexible means having a run which in a lowered position of said frame is disposed at an angle to the general direction of slope of said table portions, said angle converging in a direction from said receiving zone toward said delivery zone, said motor means being operatively connected to said frame, portions of said run being operative so to engage and urge rods and the like on said table in an upward position of said frame.

8. The apparatus defined in claim 6 and including in addition a sensing device operable to sense the absence of rods and the like generally adjacent said delivery zone, control means operably interposed between said sensing device and motor means, said device, responsive to sensing such absence, being operable to actuate said control means for increasing said force exerted by said motor means, whereby further to elevate said drag means.

9. Apparatus for delivering rods and the like from a bundle one at a time to a delivery point comprising, an open framework table having laterally spaced members which extend from a receiving zone adapted to receive a bundle of rods to a delivery zone, a frame beneath said table mounted for movement in a generally vertical direction toward and away from said table, a plurality of endless flexible elements such as chains supported by wheels such as sprockets on said frame, said sprockets being laterally spaced and positioned in alignment with spaces between said table members, said flexible elements having upper runs, drive means operable to move said chains so that said upper runs move in a direction from said receiving zone toward said delivery zone, motor means operable to move said frame between a lower position and an upper position wherein said upper runs are disposed in the spaces between said table members for dragging engagement with rods and the like thereon, said table members having stepped upper surfaces wherein the steps become horizontally shorter and vertically higher progressively in the direction from said delivery zone toward said receiving zone so that said upper runs close progressively in said direction relative to rods and the like on said table members, said motor means being operable to exert upward force on said frame less than the weight of a bundle of rods with which said apparatus is adapted to be used, whereby to prevent avalanche delivery of said rods to said delivery zone and facilitate automatic elevation of said frame responsive to diminution of the weight of said loads or the like incidental to delivery thereof from said table.

10. The apparatus defined in claim 9 wherein said upper runs have portions which slope downwardly away from said delivery zone toward said receiving zone in a lower position of said frame.

11. The apparatus defined in claim 9 characterized in that said apparatus has a bed on which is mounted a plurality of wheels such as sprockets drivingly engaged with said flexible elements, said frame being pivotally mounted on said bed for swinging in said vertical direction relative to said table.

References Cited by the Examiner
UNITED STATES PATENTS

| | | | |
|---|---|---|---|
| 3,108,699 | 10/1963 | Anschutz | 214—1 |
| 3,157,292 | 11/1964 | Pachell | 214—1 |
| 3,182,816 | 5/1965 | Illo | 214—1 |
| 3,202,263 | 8/1965 | Stuller et al. | 198—34 |
| 3,208,577 | 8/1965 | Mann | 198—34 X |

MARVIN A. CHAMPION, *Primary Examiner.*